United States Patent [19]

Linder et al.

[11] Patent Number: 4,759,670
[45] Date of Patent: Jul. 26, 1988

[54] MULTI-PURPOSE TWO-PIECE PLASTIC FASTENER

[75] Inventors: David Linder, Glen Ellyn; Joseph Bart, St. Charles, both of Ill.

[73] Assignee: Phillips Plastics Corporation, Phillips, Wis.

[21] Appl. No.: 874,660

[22] Filed: Jun. 16, 1986

[51] Int. Cl.⁴ .................................................. F16B 13/04
[52] U.S. Cl. ..................................... 411/43; 24/453; 411/182; 411/339; 411/510; 411/908
[58] Field of Search ................. 411/43, 39, 508, 509, 411/510, 182, 907, 908, 40, 41, 338, 339, 512; 24/297, 104, 107, 453, 662

[56] References Cited

U.S. PATENT DOCUMENTS

| | | | |
|---|---|---|---|
| 2,298,203 | 10/1942 | Eklund | 411/510 |
| 2,926,409 | 3/1960 | Perry | 411/512 X |
| 3,238,835 | 3/1966 | Rosenberg | 411/338 |
| 3,251,260 | 5/1966 | Serdechny | 411/338 |
| 3,286,580 | 11/1966 | Jeal | 411/41 X |
| 4,138,921 | 2/1979 | McGauran et al. | 411/510 |
| 4,176,428 | 12/1979 | Kimura | 411/509 X |
| 4,556,351 | 12/1985 | Wollar et al. | 411/43 X |
| 4,648,766 | 3/1987 | Wollar | 411/41 |

FOREIGN PATENT DOCUMENTS

| | | | |
|---|---|---|---|
| 1729965 | 7/1971 | Fed. Rep. of Germany | 24/107 |
| 1332688 | 6/1963 | France | 411/339 |
| 425080 | 9/1947 | Italy | 411/510 |
| 589735 | 3/1959 | Italy | 24/662 |
| 223245 | 11/1942 | Switzerland | 24/104 |
| 442833 | 1/1968 | Switzerland | 24/662 |

Primary Examiner—Lloyd A. Gall
Attorney, Agent, or Firm—James E. Nilles; Thomas F. Kirby

[57] ABSTRACT

A two-piece molded plastic fastener comprises a hollow body and a pin insertable thereinto. The body has a head and a bore defined by a resiliently deformable grooved bore wall. The pin has a pin head and a serrated pin shank. When fully installed in an aperture in a workpiece (which comprises one or more panels), the serrated pin shank is frictionally engaged with and digs into the resilient grooved bore wall (i.e., is "set"), and the two heads bear against opposite sides of the workpiece. Depending on fastener design, the heads either apply a predetermined pressure on the workpiece (depending on the setting force) or are maintained at a predetermined distance from each other when set. Either the body or pin or both may embody features (such as holes, screw threads, hooks, snap fasteners) which enable objects to be secured thereto. In addition, the pin may have an axial bore therethrough to enable the fastener to serve as a bushing. The body and pin may be installed separately in the aperture from opposite sides of the workpiece and then set, either manually or with a known tool which engages and then detaches a breakaway extension on the pin shank projecting from the bore. Alternately, a pre-assembled body and pin (with breakaway extension) may be installed and set from one side of the workpiece, if the workpiece aperture and both fastener heads are appropriately shaped.

16 Claims, 8 Drawing Sheets

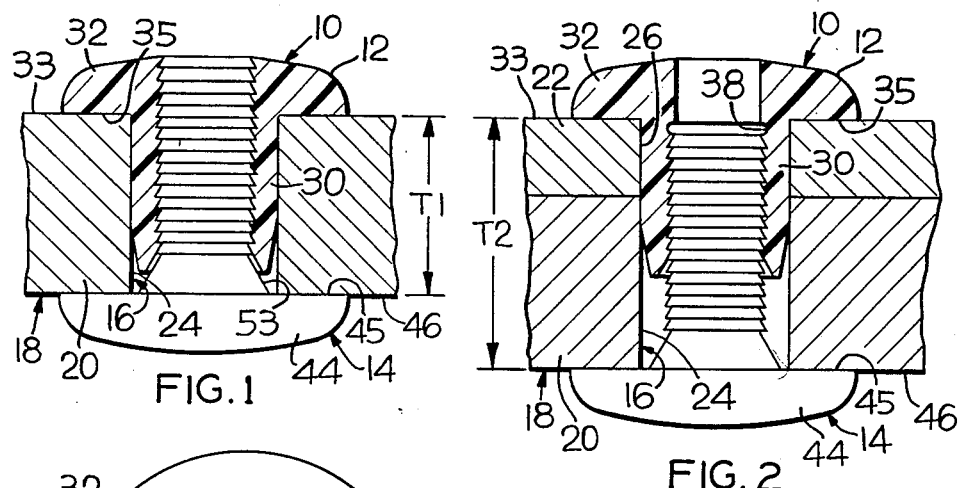
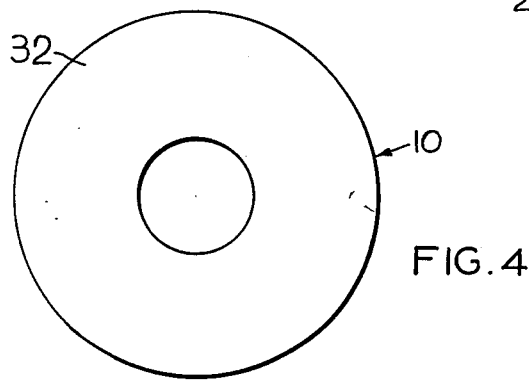
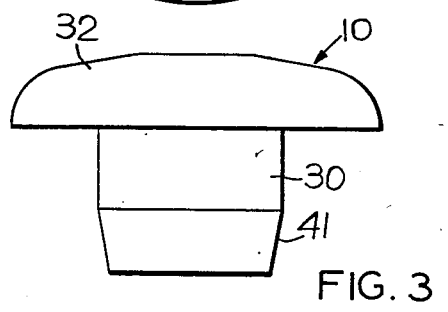
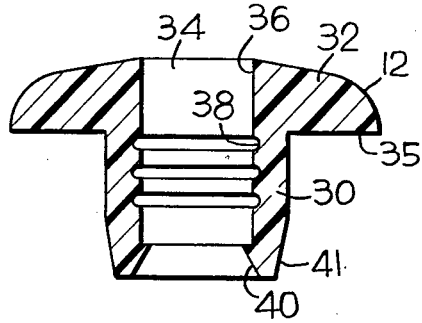
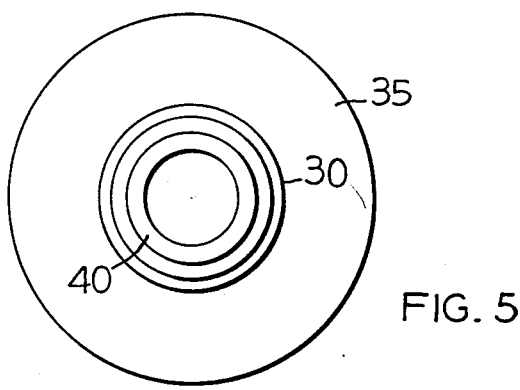

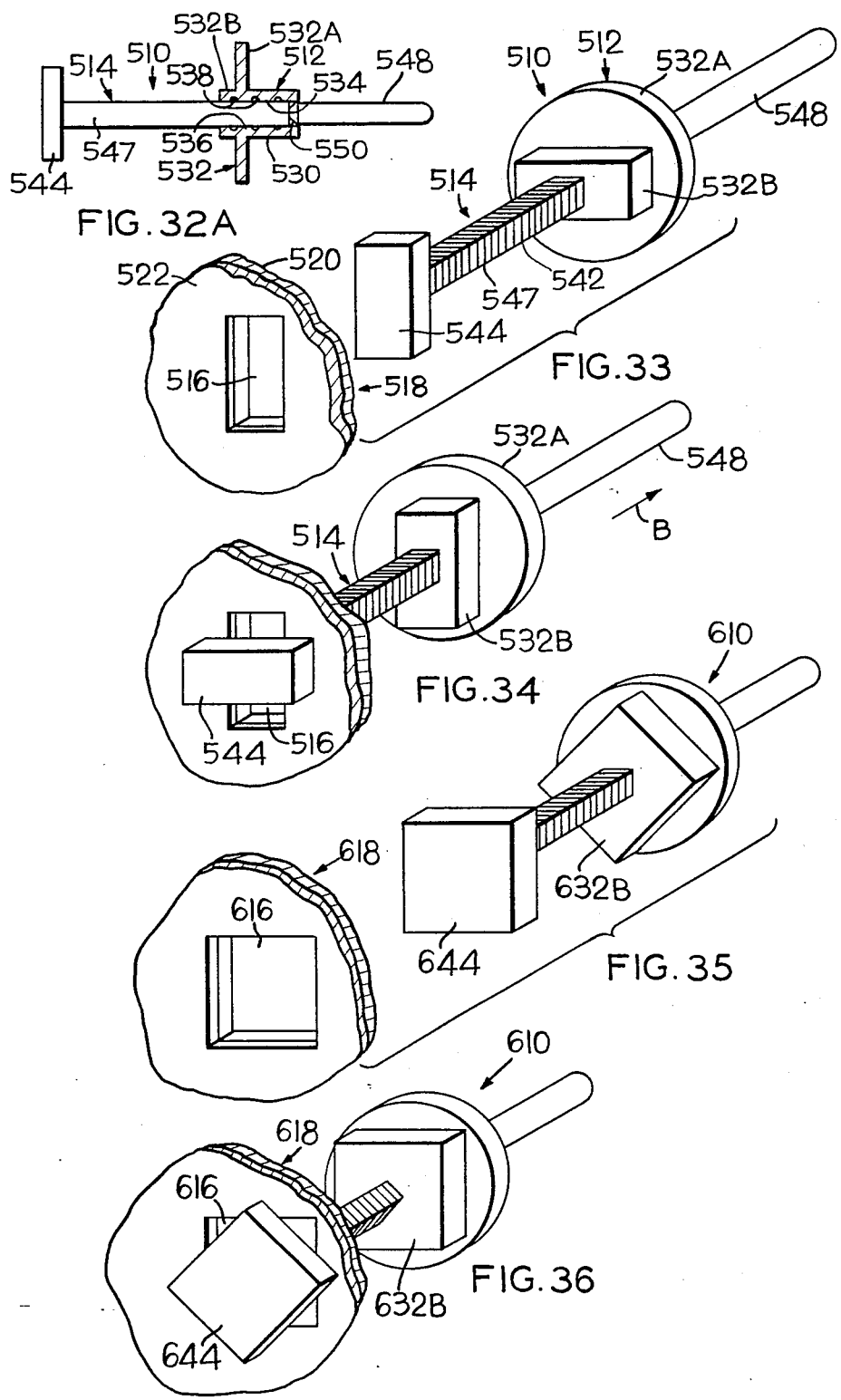

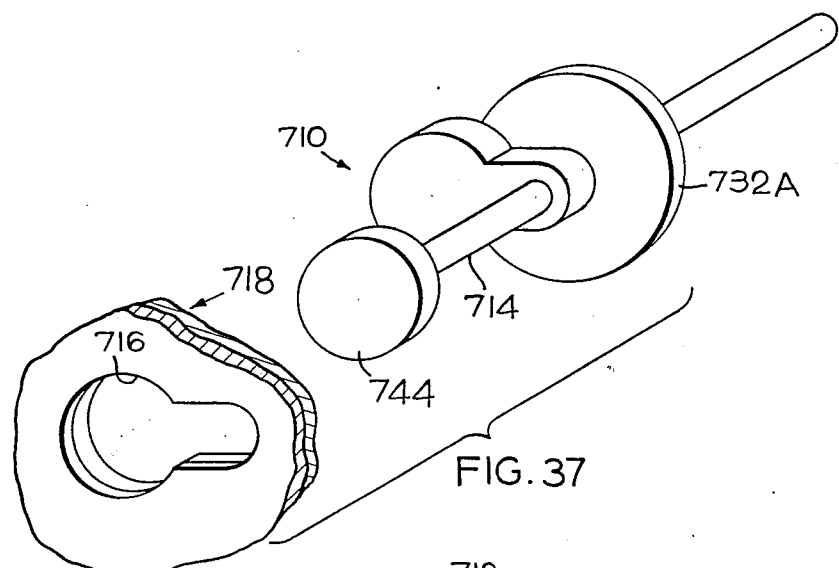
FIG. 37
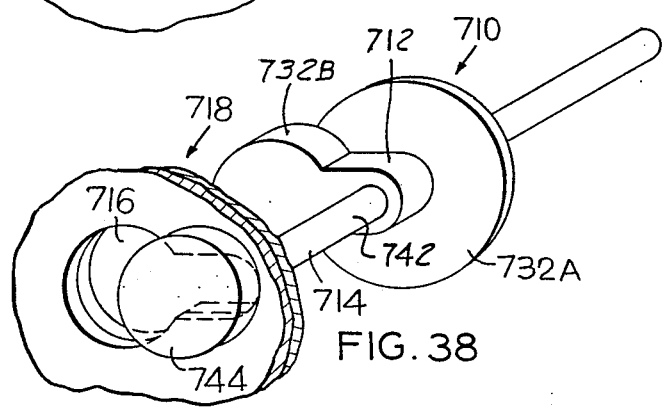
FIG. 38
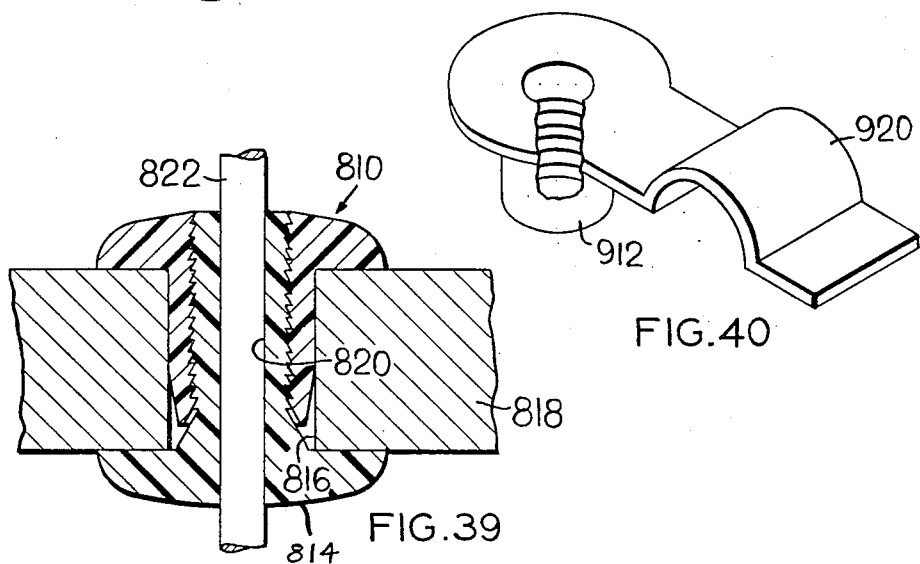
FIG. 39
FIG. 40

MULTI-PURPOSE TWO-PIECE PLASTIC FASTENER

BACKGROUND OF THE INVENTION

1. Field of Use

This invention relates generally to a multi-purpose two-piece molded plastic fastener which is adapted for permanent installation in an aperture through a workpiece which comprises one or more panels. The fastener comprises a hollow body having a head and a bore and further comprises a pin having a head and pin shank insertable into the bore. The fastener is usable, depending on its specific embodiment, to secure several panels together to form a workpiece, or to secure some object to a workpiece, or to secure some object to a workpiece, or to serve as a bushing or grommet in the aperture in the workpiece.

In particular, the invention relates to improvements in the design and construction of such a fastener to enhance its utility.

2. Description of the Prior Art

Many types of two-piece fasteners, made of metal or plastic, and comprising a pin which is insertable into a hollow body, are known and in use. Typically, each type of fastener is designed and constructed to suit a very special purpose. It is not uncommon, therefore, that the basic principles of design, construction and operation embodied in special purpose fasteners usually inhibit or prevent design changes or variations which would enable the fastener to be used in a wide variety of other applications. For example, modification of one part of a known two-piece fastener to meet some special purpose may, as a consequence, also require modification or redesign of the other part and thereby alter its basic design. Or, some prior art two-piece fasteners can only be installed in an aperture in a workpiece from opposite sides of the workpiece, but in some situations only one side of the workpiece is accessible for installation. In some cases, a prior art fastener performs only one basic function, such as holding two panel members together, and cannot be further adapted to perform some additional function, such as attachment of some object to the panel members.

SUMMARY OF THE INVENTION

A multi-purpose two-piece molded plastic fastener in accordance with the invention is adapted for permanent installation in an aperture through a workpiece which comprises one or more panels. The fastener comprises a hollow body having a head and a bore and further comprises a pin having a head and pin shank insertable into the bore. The fastener is usable, depending on its specific embodiment, to secure several panels together to form a workpiece, or to secure some object to a workpiece, or to serve as a bushing or grommet in the aperture in the workpiece.

The fastener embodies improvements in: the means on the body and pin whereby the pin is forced into and maintained in frictional engagement in the bore in the hollow body; the means whereby the heads of the body and/or pin are adapted to enable fastener installation from either one side or both sides of the workpiece; and the means whereby the fastener is adapted to support other objects on the workpiece.

As regards the workpiece, it may comprise a single panel having an aperture therethrough, and the fastener can be used therewith to seal the aperture or to support some object on the single panel. Or, the workpiece may comprise two or more panels having aligned holes defining an aperture, and the fastener can be used to secure the panels together. One such panel may be a batt of easily compressible material such as insulation or the like.

As regards the fastener, the body is formed of resilient deformable plastic and generally comprises a body shank, a body head (external flange) at one (head) end of the body shank, a bore in the body shank defined by a resiliently deformable bore wall, and, in a preferred embodiment, axially spaced apart grooves formed in the wall of the bore to accommodate bore wall material displaced by pin insertion. The pin, which could be formed of metal but is preferably plastic, generally comprises a pin shank, a pin head (external flange) at one (head) end of the pin shank, and axially spaced apart serrations on the pin shank, which serrations are of greater diameter than the bore diameter. When the fastener is fully installed (i.e., fully set) in the workpiece aperture, the pin serrations dig into and frictionally engage the resiliently deformable bore wall, and the heads on opposite ends of the fastener engage opposite sides of the workpiece. The grooves in the bore wall enable or facilitate or accommodate displacement of plastic material forming the bore wall as the pin serrations dig into the bore wall.

As regards various embodiments of the fastener, the body and pin may be installed from the opposite sides of the workpiece and then set, either manually (using mallets) or with a known type of tool which engages a breakaway extension (frangibly connected to the pin shank) which projects from the head end of the body. The tool engages the breakaway extension, draws the pin axially while maintaining the body stationary and breaks off the extension when the fastener is set. Alternately, a pre-assembled body and pin (which pin also has such a breakaway extension) may be installed in the workpiece aperture and "set" from only one side of the workpiece, provided the workpiece aperture and both fastener heads are of special configuration, as hereinafter explained.

The fastener can be constructed so that the heads apply a predetermined pressure on opposite sides of the workpiece, depending on the extent to which the body and pin are forced into frictional engagement and the setting force require. Alternately, the fastener can be constructed so that the heads are maintained at a predetermined distance from each other when the fastener is set, because the body and pin then "bottom out" on each other. Either or both heads may be constructed so that some object, such as a screw or hook, may be attached thereto.

A fastener in accordance with the invention offers many advantages over the prior art. For example, the pin and body can be economically formed by injection molding in relatively non-complex molds using plastic materials which have desired properties or characteristics, such as hardness, resiliency, and color. Since the body is not formed of extremely flexible plastic, such as is required in blind expansion nuts or rivets or the like (but merely of plastic which has a certain degree of resiliency and deformability at its bore wall), a larger selection of plastic materials is available and features such as strength, temperature resistance, cost, and so forth, can be optimized.

Head shapes can be varied in size and configuration to suit various applications, while retaining a basic configuration for the body shank and pin shank and techniques of installation.

The means whereby the pin shank is frictionally engaged in the body bore are configured to enable easy insertion of the pin shank but, when the fastener is set, firmly resist accidental separation or intentional separation (as from tampering, vandalism, etc.) of the pin and body and loosening from vibration.

Use of special head configurations adapt the fastener for installation and setting from one side of a workpiece.

The fastener can be designed so that the heads apply a clamping force of predetermined magnitude to opposite sides of the workpiece when the fastener is set, which is especially useful when two or more panels are to be tightly secured together. Setting force is determined by the amount of friction encountered as the serrated shank and grooved bore wall engage, in view of the amount of axial force required to separate the breakaway portion of the pin from the pin shank at the weakened breakaway joint therebetween. Or, the fastener can be designed so that the heads maintain a certain spaced apart distance from each other when set, which is especially useful when a panel of crushable material, such as a batt of foam rubber, foam plastic, fiberglass insulation, gasket material, cloth padding or the like, is to be secured to a rigid panel. Clamping such materials too tightly at the fastener attachment points can cause crushing, rippling, distortion and loss of thermal insulating properties. Therefore, clamping to accommodate a given thickness is desirable and is accomplished by designing the fastener so that portions of the pin and body engage or "bottom out" when a certain predetermined distance is established between the heads and so that sufficient setting force exists between the pin shank serrations and grooved bore wall at this distance.

If such a batt is to be secured to another panel, the pin may be provided with a sharp point to pierce the batt and form its own hole therethrough.

The pin can be made hollow and threaded to enable the installed fastener to function as a grommet in installation where conventional grommets are not feasible, or to function as a "slipping", self-lubricating bushing or bearing for a rotating or reciprocating shaft, rod or cable, such as in automobile door latch mechanism or other types of equipment. Or, a hole in or through the hollow pin may be threaded to receive a screw.

Most embodiments of the fastener lend themselves to automatic feeding, pre-assembly and installation.

Other objects of the invention will hereafter appear.

DRAWINGS

FIG. 1 is a cross-section view of a first embodiment of a fastener (comprising a body and a pin) in accordance with the invention shown fully installed in an aperture in a single panel workpiece of minimum thickness;

FIG. 2 is a view similar to FIG. 1 showing the same fastener with a two-panel workpiece of maximum thickness;

FIGS. 3, 4, 5 and 6 are, respectively, side elevation view, head end plan view; insertion end plan view and cross-section view of the fastener body of FIGS. 1 and 2 prior to installation;

Figure 25:
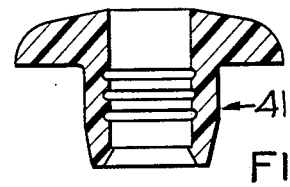
FIG. 25 is a cross-section view of the body of a fastener of a fourth embodiment.
Figure 28:
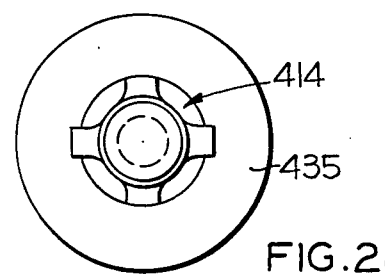
Figure 27:
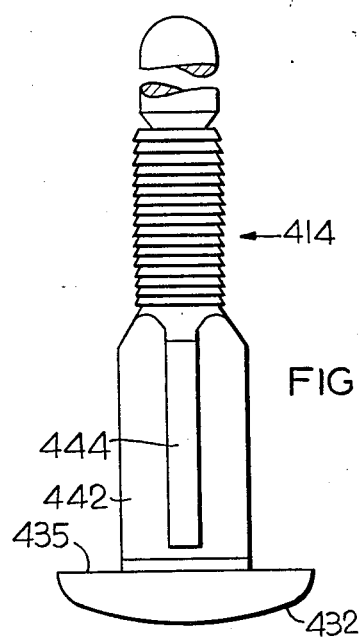
Figure 26:
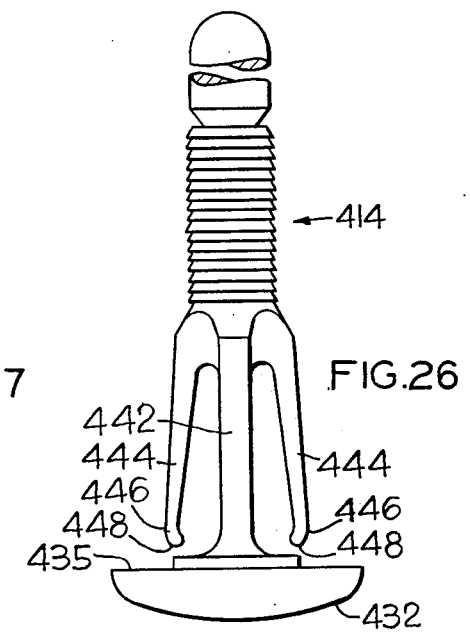
Figure 29:
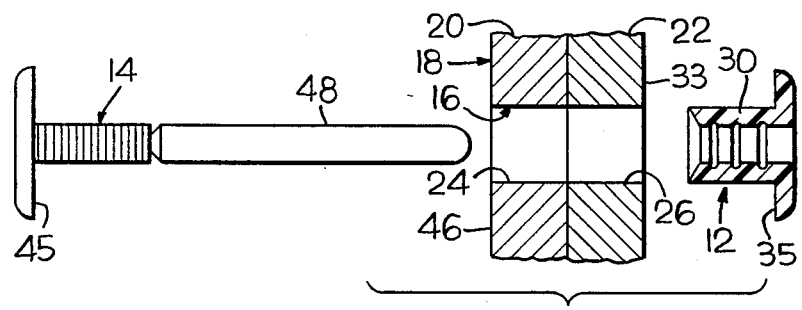
Figure 30:
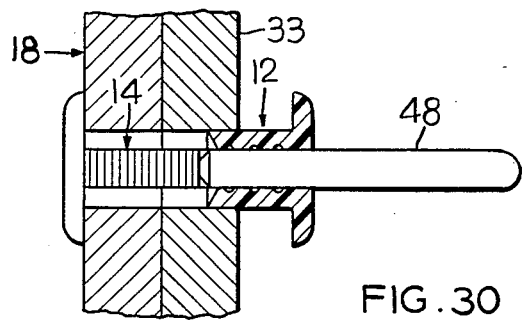

FIGS. 26, 27, and 28 are, respectively, one side elevation view, another side elevation view and insertion end plan view of the pin for use with the body shown in FIG. 25;

FIGS. 29, 30, 31 and 32 are schematic side elevation views, partly in cross-section, showing the sequence of steps involved in installation and setting the first embodiment of the fastener shown in FIGS. 1 through 9 by means of a known type of tool;

FIGS. 32A and 33 are, respectively, a cross-section view and an isometric view of a pre-assembled fastener in accordance with a fifth embodiment of the invention and shows it prior to insertion of its pin head (having the shape of an elongated rectangle) through a workpiece aperture of corresponding shape and size;

FIG. 34 is a view similar to FIG. 33 but showing the pin head inserted through the aperture, rotated 90°, and engaged with a side of the workpiece;

FIGS. 35 and 36 are views similar to FIGS. 33 and 34, respectively, of a sixth embodiment of a fastener having a pin head of square configuration and rotatable through 45° after insertion through the workpiece aperture;

FIGS. 37 and 38 are views similar to FIGS. 33 and 34, respectively, of a seventh embodiment of a fastener having a pin head of circular configuration and laterally shiftable in a keyhole-shaped workpiece aperture after insertion therethrough;

FIG. 39 is a cross-section view of a fastener in accordance with an eighth embodiment of the invention, which serves as a bushing or bearing, in which the pin has an axial bore extending entirely therethrough for slidably or rotatably accommodating a rod or the like therein; and FIG. 40 is an isometric view of a body of a fastener in accordance with the invention in which the body head takes the form of a wire clamp.

DESCRIPTION OF PREFERRED EMBODIMENTS

The Workpiece

The various embodiments of a two-piece fastener, hereinafter described, (which comprises a body and a pin) in accordance with the present invention are adapted for installation in an aperture 16 in a workpiece 18. Workpiece 18 takes the form of a single panel 20 (FIG. 1) having a single hole 24 defining aperture 16 or takes the form of a plurality of panels, such as panels 20 and 22 (FIG. 2) having aligned or registering holes 24 and 26, respectively, which define aperture 16. Aperture 16 is typically cylindrical, but could have other shapes, as hereinafter explained. The panels 20 and 22 may be formed of any material, such as wood, metal, fiberboard or plastic. The panels may be rigid, or flexible and compressible, or any combination thereof. The panel holes 24 and 26 may be preformed in rigid materials, as by punching or drilling, or may be formed during installation of the fastener, if the panel material is of such a nature to be easily pierced by a sharp-pointed forming part of the fastener, as in the case of insulation batts made of fiberglass, foam plastic or the like. Each workpiece 18 has an optimum minimum thickness and an optimum maximum thickness (compare T1 and T2 in FIGS. 1 and 2, respectively) with respect to the ability of its aperture 16 to accommodate a fastener of a particular length (i.e., the distance between the undersides of the body head and pin head). If the workpiece is too thin, the fastener cannot form a firm connection. If too thick, frictional interengagement between the fastener parts (body and pin) may be insecure and insufficient to firmly connect those parts and the panels to be joined, in view of forces applied to the panels.

The Fasteners

First Embodiment

As FIGS. 1 through 9 show, fastener 10 comprises hollow body 12 and pin 14, both of which are preferably formed of resilient, deformable flexible plastic, such as Nylon TM or the like, by the process of injection molding. However, pin 14 could be made of metal, if desired.

Referring to FIGS. 1 through 6, body 12 has a body shank 30 for insertion in workpiece aperture 16 and has an external flange or head 32 for engagement with one side 33 of workpiece 18. Body shank 30 has an outside diameter which, preferably, is near in size to that of aperture 16 and is preferably of the same shape, such as cylindrical, to ensure a snug fit in a cylindrical aperture 16. Flange or head 32 can be located at or near the head end of body shank 30, but is shown as a circular head located at the very end of the body shank. Head 32, which has an underside 35, can have whatever size, shape or diameter is suitable for a particular installation; a large diameter head being preferred if the adjacent workpiece 18 is compressible or crushable. Body shank 30 is tapered as at 41 at its insertion end to facilitate its insertion into aperture 16. Body 12 has a bore 34, shown as cylindrical, which extends entirely therethrough (and through head 32) and which is defined by a bore wall 36 which is resiliently deformable to a greater or lesser degree, depending on the type of plastic employed. Bore wall 36 has a plurality (three shown, for example) of axially spaced apart grooves 38 formed therein which operate to facilitate deformation of the flexible resilient bore wall 36 as pin 14 is inserted into bore 34, as hereinafter explained. The grooves 38 extend radially outwardly of the axis of bore 34 and, unlike inwardly extending projections or threads in some prior art devices, do not interfere with pin insertion and are not subject to being damaged or torn out by pin insertion. Preferably the grooves 38 are annular in shape and continuous, but could be interrupted. The grooves 38 define spaces into which portions of bore wall 36 can be deformably displaced during pin insertion. The insertion end of bore 34 is conically shaped or chamfered as at 40 to facilitate pin insertion.

It is to be noted, as shown in FIGS. 1 and 6, that body 12 and pin 14 have portions or surfaces, as at 40 on body 12 and conical surface 53 on the shank 42 of pin 14, which can interengage to limit the extent to which pin 14 can be axially inserted in bore 34. This ensures, as FIG. 1 shows, that they cannot be moved together closer than the distance T (FIG. 2) and is useful if panel 20 is made of crushable material that could be damaged if the body 12 and pin 14 are forced too close together.

Referring to FIGS. 1, 2, 7, 8 and 9, pin 14 of fastener 10 comprises a pin shank 42 for axial insertion in body bore 34 (from the lower end in FIGS. 1 and 2) and comprises an external flange or head 44 having an underside for engagement with the opposite side 46 of workpiece 18. Flange or head 44 can be located at or near the head end of pin shank 42, but is shown as a circular head located at the very end of the pin shank, and like body head 32, can have whatever size, shape or diameter is suitable for a particular installation. Pin shank 42 comprises a serrated portion 47 and a breakaway portion 48 at its insertion end which is joined to the end of serrated portion by a frangible narrowed portion 50. Serrated portion 47 comprises a plurality (seventeen shown, for example, in FIGS. 1, 2 and 7) of axially arranged serrations 52 which operate to frictionally engage and dig into resiliently deformable bore wall 36 (see FIGS. 1 and 2). Each serration 52 is preferably of the same cross-sectional configuration as body bore 34 (i.e., circular or annular, if bore 34 is cylindrical) but has a slightly larger outside diameter. For example, if body bore 34 has a diameter of 0.16 inches, then a serration 52 of pin 14 has an outside diameter of 0.176 inches, a root diameter of 0.153 inches, and an axial length of 0.020 inches. Each serration 52 is sloped in a direction that facilitates its entry into bore 34 but resists its withdrawal. Note that there are numerous (seventeen) serrations 52, as compared to the number (three) of grooves 38 in bore wall 36, and the serrations engage a major portion of the length of bore wall 36 to ensure tight engagement. The serrations 52 dig into the bore wall 36 and the grooves 38 serve as spaces into which deformed and displaced bore wall material can migrate as pin shank 42 is inserted into body bore 34. For convenience in molding, breakaway portion 48 of pin 14, which preferably is cylindrical, also has a diameter of 0.153 inches, which is slightly less than the diameter of body bore 34 and facilitates pin insertion. Frangible portion 50 has root diameter of 0.100 inches, for example, and this diameter (depending on the tensile strength of the plastic used for pin 14) determines the maximum amount of axial force required to axially detach breakaway portion 48 during pin setting when body 12 is held stationary relative to pin 14.

Figure 31:
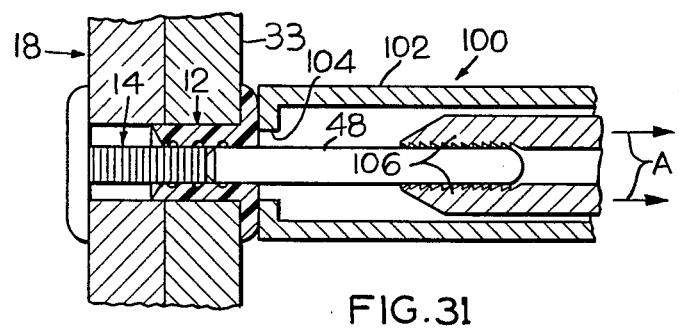
Figure 32:
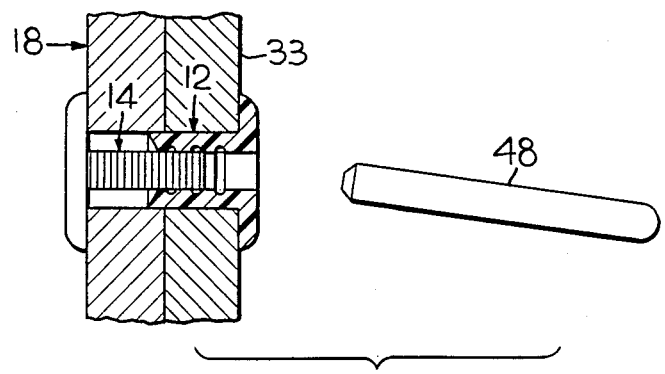

FIGS. 29 through 32 show the manner of installing fastener 10 in aperture 16 of workpiece 18 and for setting it by means of a known tool 100 (FIG. 31) which comprises a tubular mandrel 102 having a hole 104 in its end and a pair of separable serrated axially relatively movable jaws 106 therein. Pin 14 is manually inserted into aperture 16 from one side of workpiece 18 (from the left side in FIG. 29) and body 12 is manually slid onto pin 14 from the opposite side of the workpiece (from the right side in FIG. 30). As FIG. 31 shows, tool 100 is then disposed so that breakaway portion 48 of pin 14 extends through mandrel hole 104 and between the jaws 106 and so that the end of mandrel 102 bears against the outer side of body head 32. Tool 100 is then operated so that the jaws 106 grip breakaway portion 48 of pin 14 and so that the jaws 106 with portion 48 gripped therebetween move axially in the direction of the arrows A in FIG. 31 opposite to that of mandrel 102 which is manually being pushed toward workpiece 18. At a certain point, shown in FIG. 31, pin 14 is set in body 12 and the pin serrations 52 firmly and nonreleasably engage bore wall 36 of wall 36 of bore 34, as previously explained, and undersurfaces 35 and 45 of body head 32 and pin head 44, respectively, engage the opposite sides of workpiece 18. As FIGS. 31 and 32 make clear, further axial movement of the jaws 106 cause frangible portion 50 of pin 14 to fracture and breakaway portion 48 is detached from pin shank 42. Fastener 10 is designed so that the forces are balanced and breakaway occurs at the same time as setting occurs.

Second Embodiment

Referring now to FIGS. 11, 12, 13, 14 and 15, there is shown a second embodiment of a fastener in accordance with the invention. This embodiment is useful in environments where a central passage through a fastener is not acceptable because of the risk of fluid leakage therethrough.

The second embodiment of a fastener in accordance with the invention comprises a body 112 (FIGS. 10 through 13) and a pin 114 (FIGS. 14 and 15) which are generally constructed the same as body 12 and pin 14 of fastener 10, except as follows. Body 112 is preferably made of elastomeric or rubber-like material to aid in sealing aperture 116. Body 112 comprises a bore 134 having a resiliently flexible bore wall 136, which is not provided with any grooves, such as the grooves 38 hereinbefore described. Bore 134 extends only partially through body 112 and is open at its insertion end and is closed at its other (head) end by a bore wall 131 having a conical depression 133 therein. Pin 114 has a serrated portion 147 with serrations 152 like the serrations 52 previously described. However, the pin shank 142 of pin 114 does not have a breakaway portion and its insertion end is pointed and sharp as at 153 so that it can form its own aperture 16 in workpiece 18 as it is being installed, instead of depending on a preformed aperture 16. Furthermore, pin 114 comprises a groove 155 extending axially along one side thereof which intersects and passes through the serrations 152, as well as the smooth portion 156 of pin shank 142. During manual installation of body 112 and pin 114 in a panel aperture 16 from opposite sides of a workpiece 18, pin shank 142 enters body bore 134 and the serrations 152 tightly engage the bore wall 136. Pin groove 155 cooperates with bore wall 136 to define a passage which enables air trapped in the closed end of the bore 134 to escape to atmosphere and facilitates pin insertion. The tool 100, previously described, cannot be used for installation, since this must be done manually, as by using an anvil on one side and a mallet on the other, for example.

Third Embodiment

Referring to FIGS. 16, 17, 18, 19, 20, 21 and 22, there is shown a third embodiment of a fastener in accordance with the invention which comprises a body 212 having a grooved bore 234 and a pin 214 having a serrated shank portion 247. This embodiment, in which pin has a sharp tip 253, is useful in installations wherein the workpiece 18 or one of the panes 20 and 22 thereof is made of easily-pierced material (such as fiberglass, foam plastic or foam rubber) and eliminates the need to preform aperture 16, since it can be formed as pin 214 is inserted. Furthermore, pin 214 includes a breakaway portion 248 which enables use of tool 100 for installation and setting. The length of the serrated portion 247 of pin 214 relative to that of bore 234 of body 212 enables its use for a wide range of workpiece thickness.

Figure 9:
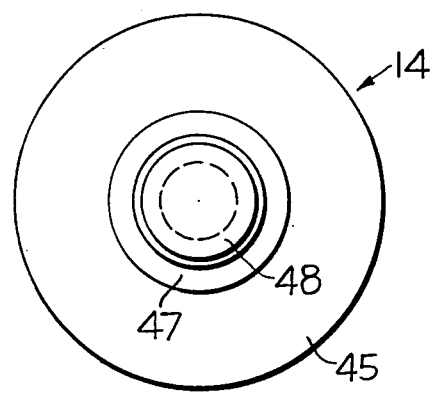
FIGS. 7, 8 and 9 are, respectively, side elevation view, head end plan view and insertion end plan view of the fastener pin of FIGS. 1 and 2 prior to installation and prior to detachment of the breakaway portion of the pin shank thereof.
Figure 15:
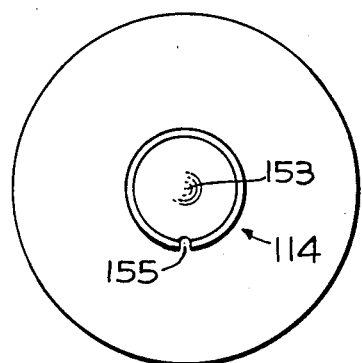
FIGS. 14 and 15 are, respectively, side elevation view and head end/plan view of the fastener pin of the second embodiment, which pin is usable with the body shown in FIGS. 10–13.
Figure 7:
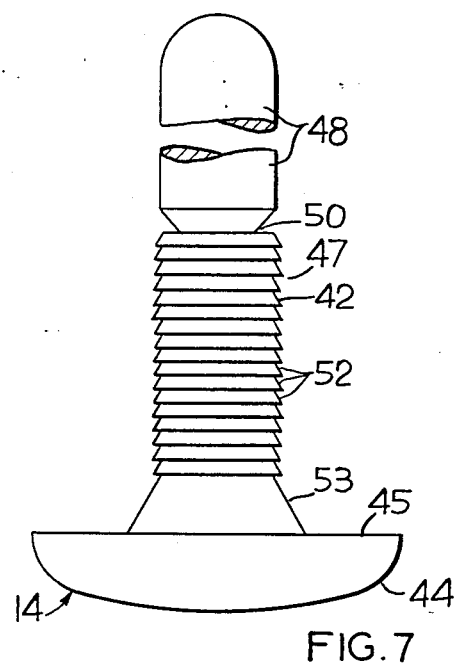
Figure 14:
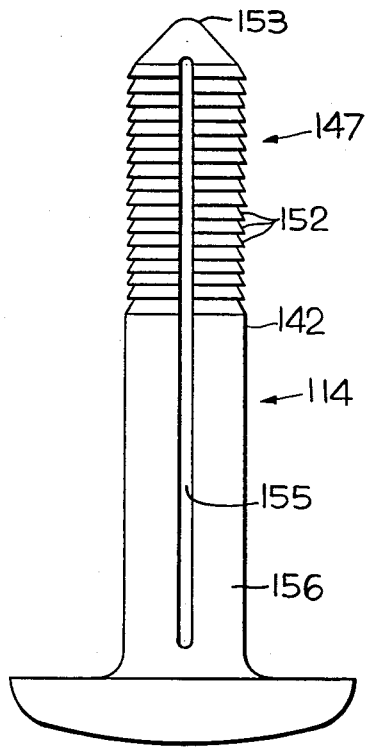
Figure 8:
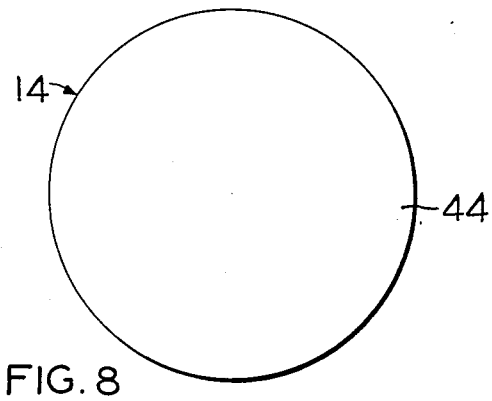
Figure 11:
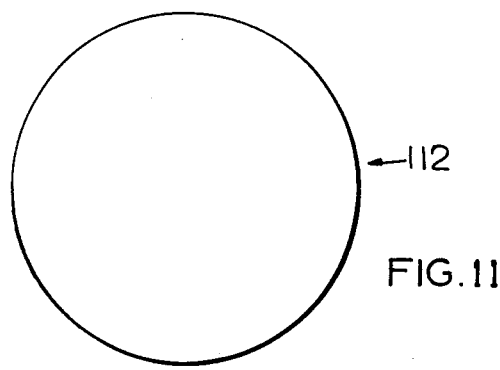
FIGS. 10, 11, 12 and 13 are, respectively, side elevation view, head end plan view, insertion end plan view and cross-section view of a fastener body of a second embodiment of a fastener in accordance with the invention.
Figure 10:
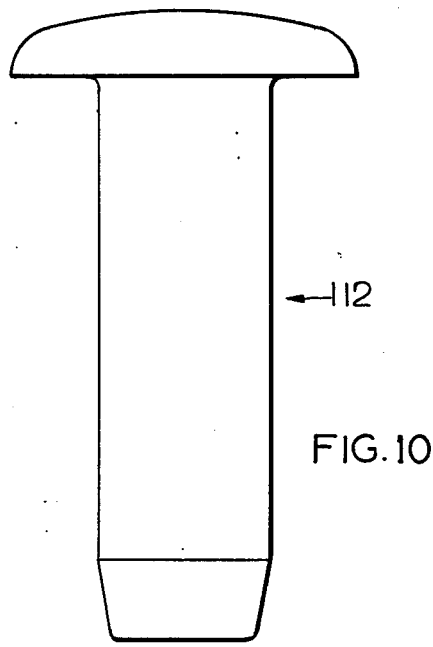
Figure 13:
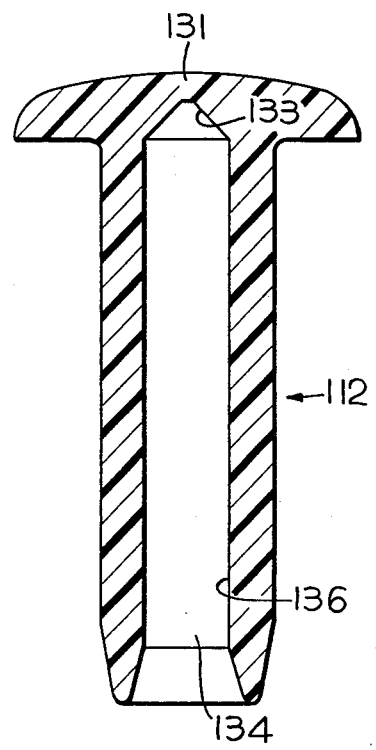
Figure 12:
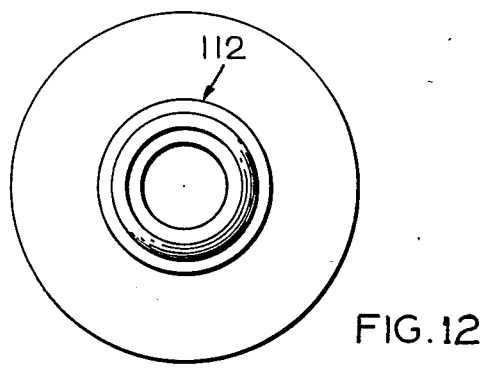
Figure 17:
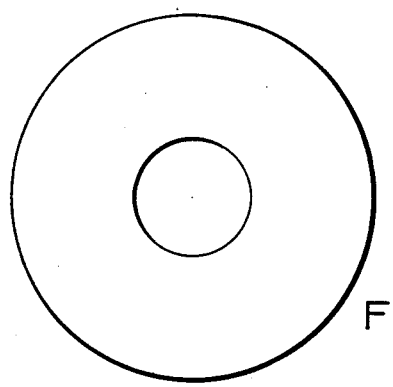
FIGS. 16, 17, 18 and 19 are, respectively, side elevation view, head end plan view, insertion end plan view and cross-section view of the body of a third embodiment of a fastener in accordance with the invention.
Figure 22:
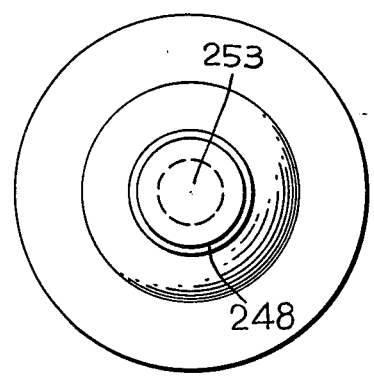
FIGS. 20, 21 and 22 are, respectively, side elevation view, head end plan view and insertion end plan view of a fastener pin of the third embodiment of the fastener, which pin is usable with the body shown in FIGS. 16–19.
Figure 16:
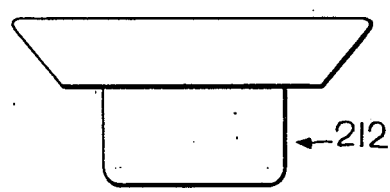
Figure 18:
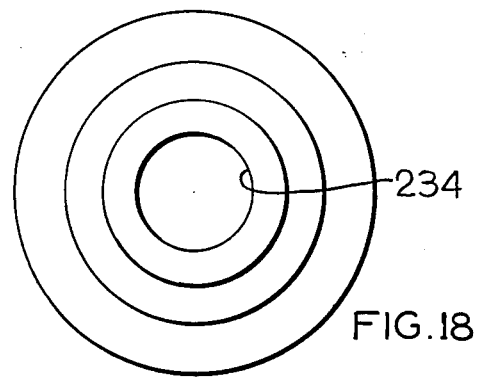
Figure 20:
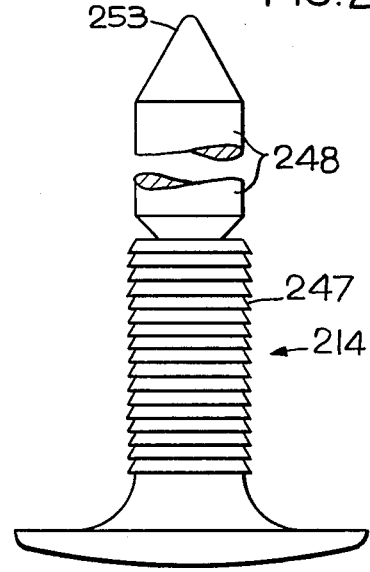
Figure 19:
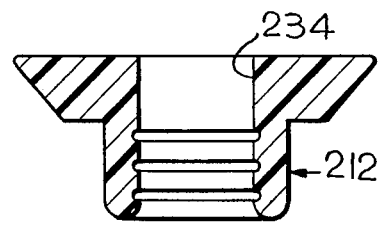
Figure 21:
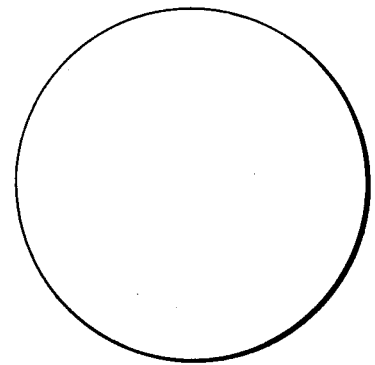
Figure 23:
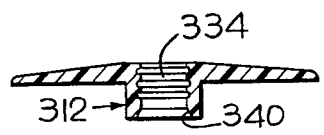
FIG. 23 is a cross-section view of the body of a modified version of the fastener of the third embodiment.
Figure 24A:
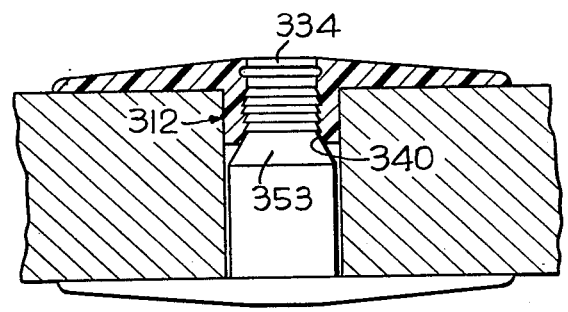
FIG. 24A is a cross-section view of the assembled body and pin of FIGS. 23 and 24.
Figure 24:
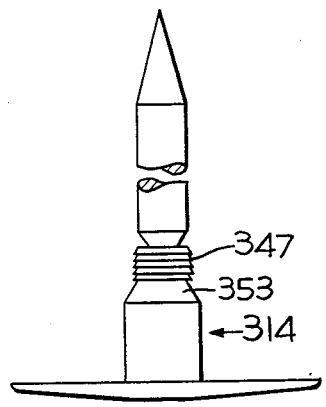
FIG. 24 is a side elevation view of the pin of a modified version of the fastener of the third embodiment, which pin is usable with the body shown in FIG. 23.

The version of the third embodiment shown in FIGS. 23, 24 and 24A is similar to that shown in FIGS. 16–22, but the serrated portion 347 of the pin 314 is much shorter and the interengageable surfaces 340 and 353 on body 312 and pin 314, respectively, "bottom out" and limit the extent to which the pin can be inserted (see FIG. 24A) in bore 334 of body 312.

The fasteners in accordance with the third embodiment are well-adapted for use to assemble insulation blankets. If the insulation material is squeezed too tightly it is crushed and it loses its insulating properties. When the material is tightened to a given thickness it is held in place but not over compressed. Note that on this design the pin has a sharp point which is used to pierce its own hole in the soft insulation material. The design also has very large diameter heads on the pins and body to distribute the load over as large an area as possible.

Fourth Embodiment

Referring to FIGS. 25, 26, 27 and 28, there is shown a fourth embodiment of a fastener comprising a body 412 (similar in all respects to body 12 previously described) and a pin 414 which comprises two integrally formed resiliently movable spring-like arms 444 on opposite sides of a shank portion 442. This embodiment is usable where, for example, one of two panels (not shown) is relatively thin (i.e., less than the distance between the ends 448 of the arms 444 and the underside 435 of head 432) and a hole therethrough (not shown) is of smaller diameter than the distance between the outer sides 446 of the arms 444. When the pin 414 is inserted into such a hole (not shown), the arms flex inward toward each other and then outward, thereby trapping the thin panel (not shown) between the arm ends 448 and the underside 435 of head 432.

Fifth Embodiment

Referring to FIGS. 32A, 33 and 34, a plastic fastener 510 is shown which is adapted to be installed and set from one side of a workpiece 518 (which comprises two panels 520 and 522) and has a rectangular aperture 516 therethrough. Fastener 510 comprises a body 512 and a pin 514. Body 512 comprises a body shank 530 having a head 532 and a bore 534 (of rectangular cross-sectional configuration) extending entirely therethrough and open at both ends. Bore 534 is defined by resiliently deformable bore walls 536 which have grooves 538 formed therein. Head 532 comprises a circular disc-like portion 532A of larger diameter than rectangular workpiece aperture 516 and an integrally formed rectangular portion 532B on one surface (which faces workpiece 518) of the same configuration as and of slightly smaller dimensions than aperture 516 so as to be able to fit thereinto.

Pin 514 of fastener 510 is pre-installed in body 512 (see FIG. 32A) and comprises a pin shank 542 for axial insertion in body bore 534 and a head 544. Pin shank 542 comprises a serrated portion 547 (of rectangular cross-sectional configuration) and a breakaway portion 548 at its insertion end (of circular cross-sectional configuration) which is joined to the end of the serrated portion by a frangible portion 550.

To install fastener 510, it is disposed relative to workpiece 518 as shown in FIG. 33. Then pin head 544 is slid entirely through aperture 516 and fastener 510 is rotated (one quarter turn or 90°) so that pin head 544 assumes an orientation wherein pin head 544 is transverse to aperture 516 and the underside of the head engages panel 522. At this stage, tool 100, shown in FIG. 31, is employed so that its mandrel 102 bears against the rear side of pin disc 532A and so that breakaway portion 548 of pin 514 is received in tool jaws 106. Tool 100 is then operated so as to draw pin 514 in the direction of arrow B in FIG. 34 and to force body 512 in the opposite direction. As this occurs, head portion 532B of body 512 enters aperture 516 of workpiece 518. At the same time serrated portion 547 of pin shank 514 is drawn fully into bore 534 of body 512 and secured therein as hereinbefore explained in connection with fastener 10.

As is apparent, fastener 510 can be installed and set in a workpiece hole 516 entirely from one side of the workpiece. Since pin shank portion 547 and body bore 534 are rectangular (i.e., non-circular) in cross-sectional configuration, pin 514 cannot rotate with respect to body 512 during installation and this ensures that fastener 510 can be manipulated and rotated as a unit during installation and setting. This ensures that pin head 544 can be properly aligned with aperture 516 (FIG. 33), inserted therethrough and again rotated so that it and head portion 532B of body 512 have the proper orientation and alignment with respect to aperture 516 during setting (see FIG. 34).

Sixth Embodiment

Referring to FIGS. 35 and 36, a sixth embodiment of the invention in the form of a fastener 610 is shown. Fastener 610 is similar in purpose, mode of installation and form to fastener 510, except that its pin head 644 and body head portion 632B are both of square configuration and are adapted to cooperate with a square aperture 616 in workpiece 618. Fastener 610 requires only one-eighth of a turn (45°) during installation, as compared to 90° for fastener 510.

Seventh Embodiment

Referring to FIGS. 37 and 38, a seventh embodiment of the invention in the form of a fastener 710 is shown. Fastener 710 is generally similar in purpose, mode of installation and form to fasteners 510 and 610, except as follows. Fastener 710 is adapted for use with an aperture 716 of keyhole shape in workpiece 718. Pin 714 of fastener 710 has a head 744 of circular shape, which fits axially through the circular portion of aperture 716 but becomes locked against axial withdrawal when fastener 710 is shifted sideways in the direction of arrow C in FIG. 38. After such shifting occurs, the complimentary keyhole-shaped head portion 732B of body 712 of fastener 710 (integral with head portion 732A) is aligned with aperture 716 and tool 100 is then employed to set fastener 710. When set, portion 732B is engaged in aperture 716. Since body 712 is the only component which requires proper rotational orientation with aperture 716 to ensure proper fit, pin shank 742 and the body bore (not visible) into which it extends can have a circular cross-sectional configuration. Rotation of pin 714 with respect to body 712 does not effect alignment of circular pin head 744 with the circular portion of aperture 716. Fastener 710 allows pin 714 and body 712 to be pre-assembled and is well-adapted to automatic feeding and installation.

Eighth Embodiment

Referring to FIG. 39, there is shown an eighth embodiment of a fastener 810 in accordance with the invention. Fastener 810 is generally similar to fastener 10 in general construction and mode of installation in aperture 816 in workpiece 818. However, pin 814 of fastener 810 is provided with a central bore 820 which enables it to function as a grommet or bushing for a member, such as a rod 822, which is slidably received in bore 820. If pin 814 is hollow, as shown, it can function as a screw grommet for soft, flexible materials where conventional, snap-in grommets would not function. The hollow pin could also work as a light weight, corrosion resistant grommet for tarps, tents, awnings, back packs or other outdoor equipment. Reinforcements such as fastener 810, of desired proportion, would allow ropes, etc. to be attached. If preferred, the hollow pin 814 could also be adapted to function as the female part of a snap fastener (not shown).

When attached to a more rigid workpiece material, the hollow pin can be made from a "slippery", self-lubricating plastic to function as a bearing for a shaft or a bushing to guide sliding rod 822. When molded from a more flexible material, the pin 814 could function as an anti-rattle guide for the rods used in door latch mechanisms in autos or for cables used in heating/air conditioning controls in automobiles.

Ninth Embodiment

Referring to FIG. 40, there is shown a body 912 of a ninth embodiment of the invention, which body has a cable clamp 920, integrally formed therewith. It is to be understood that body 912 can be used with a suitable pin, such as pin 14 previously described to secure the cable clamp 920 at a surface of a workpiece such as workpiece 18.

We claim:

1. A two-piece fastener for installation in an aperture in a workpiece and comprising a hollow plastic body and a pin:

said hollow body having an external flange engageable with one side of said workpiece and having a body shank insertable in said aperture, said body shank having a bore therein defined by a resiliently deformable bore wall, said bore wall having at least one groove therein to facilitate deformation of said bore wall by accommodating bore wall material displaced by a serration during pin insertion, said groove being immediately and completely filled by displaced material during pin insertion;

said pin having an external flange engageable with the opposite side of said workpiece and having a pin shank insertable in said bore in said body shank, said pin shank having at least one serration therearound which has a diameter greater than that of said bore for frictional engagement in a set position with said resilient bore wall when said pin shank is in said bore to prevent disengagement of said pin from said body.

2. A fastener according to claim 1 wherein said pin has a pin bore therein.

3. A fastener according to claim 2 wherein said pin bore extends axially entirely through said pin.

4. A fastener according to claim 1 wherein said bore extends entirely through said hollow body and is open at both ends, and wherein said pin shank comprises a tool-engageable breakaway portion which extends outwardly from said bore when said pin shank is inserted in said bore and by means of which said pin shank is axially movable into said set position, said breakaway portion being detachable from said pin shank after said pin is in said set position and a predetermined axial force is applied to said breakaway portion while said body is maintained relatively stationary.

5. A fastener according to claim 1 or 2 or 3 or 4 comprising means on said body and on said pin which inter-engage when said pin shank is inserted and set at a predetermined axial position in said bore to thereby prevent further insertion and maintain the two flanges spaced apart at a predetermined distance.

6. A fastener according to claim 4 wherein said breakaway portion is connected to said pin shank by frangible means which are constructed to break when said fastner is set and a predetermined axial force is applied to said breakaway portion.

7. A fastener according to claim 4 wherein said external flange on said pin is insertable through said aperture and engageable with said opposite side of said workpiece when said fastener is moved with respect to said aperture, and wherein said external flange on said body comprises projecting means engageable in said aperture when said fastener is so moved and subsequently set.

8. A fastener according to claim 7 wherein said flange on said pin is circular in shape and wherein said projecting means in non-circular in shape.

9. A combination according to claim 7 wherein said aperture has a predetermined shape and size, wherein said external flange on said pin engages said opposite side of said workpiece and corresponds in shape and size to said predetermined shape and size but is angularly offset relative to said aperture, and wherein said external flange on said body engages said one side of said workpiece and comprises projecting means corresponding in shape and size to said predetermined shape and size and extends into and engages said aperture.

10. A combination according to claim 7 or 9 wherein said serration and the portion of said bore wall engaged therewith both have non-circular cross-sectional configurations.

11. A fastener according to claim 7 wherein both of said flanges are rectangular in shape and angularly offset relative to each other with respect to the axis of said fastener.

12. A fastener according to claim 11 wherein said flanges are elongated rectangles of the same size and shape.

13. A fastener according to claim 11 wherein said flanges are squares of the same size and shape.

14. A fastener according to claim 1 wherein said bore is cylindrical and said serration is annular.

15. A fastener according to claim 14 wherein said body shank comprises a plurality of annular grooves formed in said bore wall which are axially spaced apart from each other, and wherein said pin shank comprises a plurality of serrations.

16. A fastener according to claim 1 wherein the insertion end of said pin shank terminates in a point which is adapted to pierce at least a portion of said workpiece to provide a portion of said aperture in said workpiece.

* * * * *